Sept. 2, 1924.
R. D. PUGH
1,507,299
SELF FEEDER
Filed Jan. 17, 1923  2 Sheets-Sheet 2
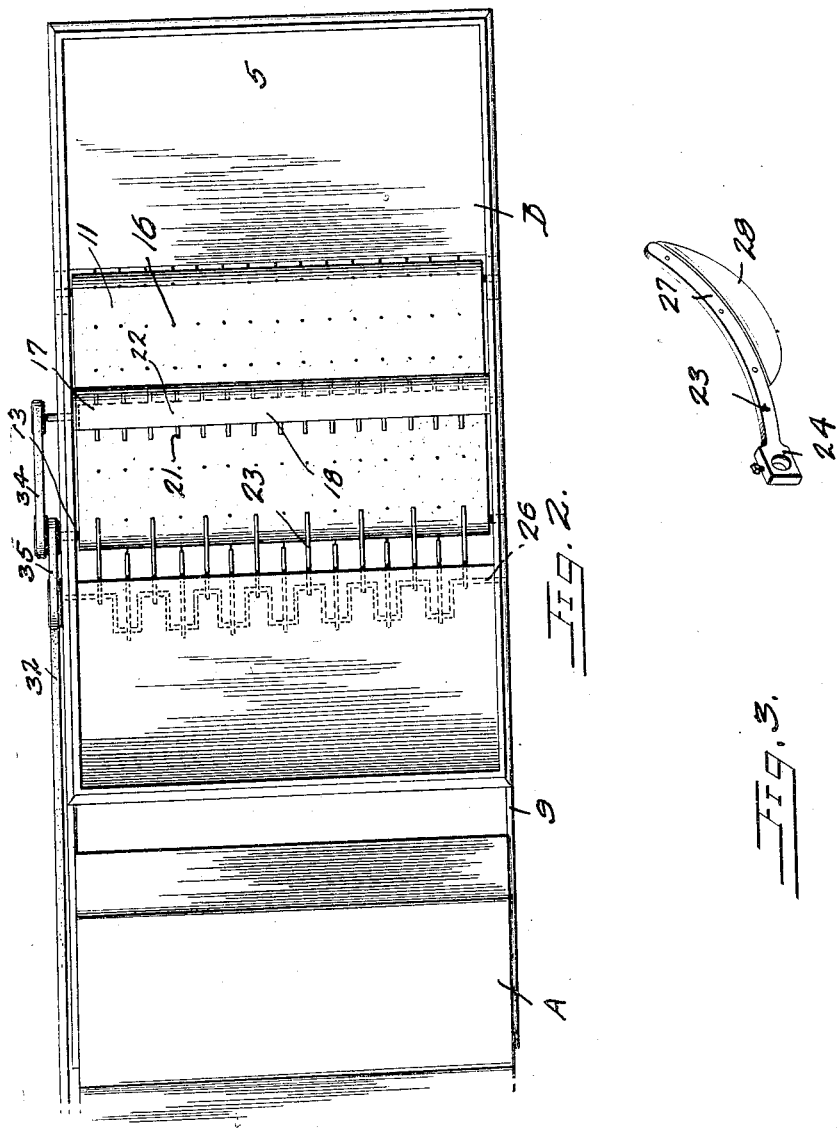
Inventor
R.D. PUGH,
By Richard B. Owens
Attorney Patented Sept. 2, 1924.

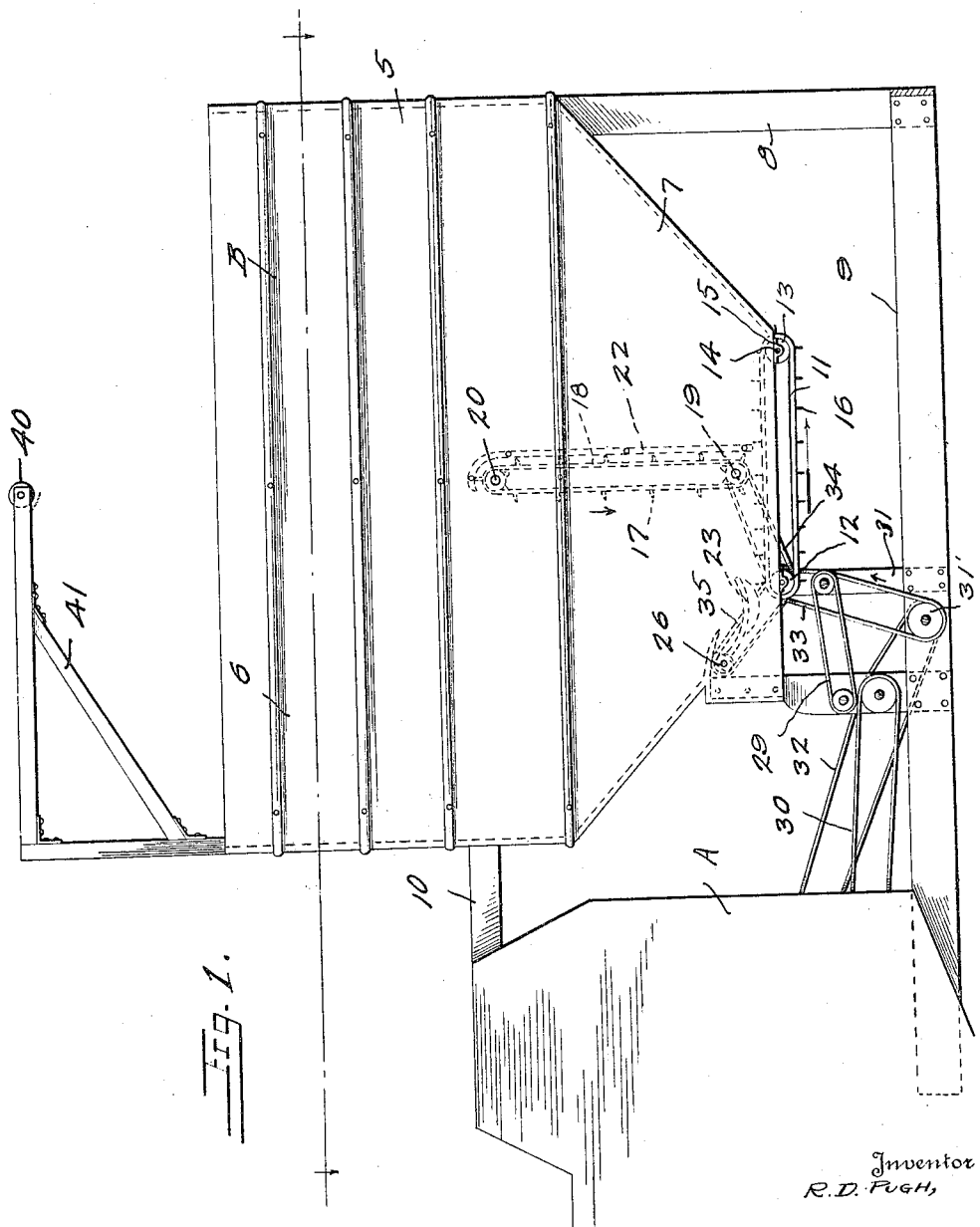

1,507,299

UNITED STATES PATENT OFFICE.

RUSSELL D. PUGH, OF EUREKA, KANSAS.

SELF-FEEDER.

Application filed January 17, 1923. Serial No. 613,213.

*To all whom it may concern:*

Be it known that I, RUSSELL D. PUGH, a citizen of the United States, residing at Eureka, in the county of Greenwood and State of Kansas, have invented certain new and useful Improvements in a Self-Feeder, of which the following is a specification.

This invention relates to an attachment for grain separators and the primary object of the invention is to provide an improved self-feeding attachment for separators, which includes novel means for permitting a number of bundles to be fed into the feeder at one time, novel means for cutting the bundles and novel means for feeding the cut bundles to the separator.

A further object of the invention is to provide novel means for preventing the clogging of the self-feeder when a plurality of bundles are dumped into the hopper thereof.

A further object of the invention is to provide an improved self-feeder for grain separators embodying an enlarged hopper for receiving the bundles, means for elevating the bundles or shocks into the hopper, a vertically disposed endless conveyor for preventing the clogging of the bundles in the hopper, novel means for conveying the bundles toward the cutters, and novel means for conveying the cut bundles from the conveyor to the separator.

A still further object of the invention is to provide an improved self-feeder of the above character, which will be durable and efficient in use, one which will be simple and easy to manufacture and one which will handle all types of grain under various conditions.

With these and other objects in view the invention consists in the novel construction, arrangement and formation of parts, as will be hereinafter more specifically described, claimed and illustrated in the accompanying drawings, forming a part of this specification, in which drawings:

Figure 1 is a side elevation of the improved self-feeder showing the same attached to a grain separator.

Figure 2 is a top plan view of the improved self-feeder.

Figure 3 is a detailed perspective view of one of the knives utilized for cutting the shocks or bundles.

Referring to the drawings in detail, wherein similar reference characters designate corresponding parts throughout the several views the letter A indicates a separator and B the improved self-feeder therefor.

The separator A can be of the ordinary or any preferred character and has merely been shown to illustrate the connection between the improved self-feeder and the separator, and the separator will not be described in detail.

The improved self-feeder comprises a relatively large hopper 5, which can be formed of any desired material, such as wood or tin and includes an upper rectangular-shaped body portion 6 and a lower funnel-shaped portion 7. This hopper 5 is held in position by upstanding standards 8, which are secured to a suitable horizontally disposed frame 9. This frame 9 can be attached in any preferred way to the separator A if so desired. The upper end of the separator A can be provided with brace bars 10 for engaging the upper portion of the self-feeder. As clearly shown in Figure 1 of the drawings the lower funnel-shaped end 7 of the hopper 5 is left open and is provided with a suitable type of endless conveyor 11. This conveyor 11 is trained about suitable rollers 12 and 13 which are carried by shafts 14 rotatably mounted in bearings 15. This conveyor 11 can consist of transversely extending slats having a plurality of spaced upstanding tongues 16. Disposed intermediate the ends of the conveyor 11 is a vertically disposed conveyor 17. The conveyor 17 functions as means for preventing the clogging up of the shocks or bundles in the hopper 5 and consists of an endless belt 18 trained about upper and lower rollers 19 which are mounted on shafts 20. The shafts 20 are mounted in suitable bearings carried by the walls of the hopper. The endless belt 18 can be provided with transversely extending rows or flights of prongs or teeth 21 as clearly seen in Figures 1 and 2 of the drawings.

It can be seen that the belt will pull the bundles downward toward the conveyor 11 and thus effectively prevent the clogging of the bundles in the hopper. A guard formed of sheet metal or the like 22 is provided for one side of the conveyor 17, so that the bundles will only be pulled down in one direction.

As the bundles are fed toward the separator by the conveyor 11 the same are engaged by a plurality of knives 23 the inner ends of which terminate in eyes 24 for the reception of the crank shaft 26 to which they are affixed in any preferred way. The knives 23 include an arcuate shank 27 having an arcuate cutting blade 28 secured thereto. Thus it is obvious that the bundles will be cut as the same are fed toward the separator.

In order to permit the feeding of the cut bundles directly into the separator a relatively short conveyor belt 29 and a relatively long conveyor belt 30 is provided. This conveyor belt 30 extends directly into the separator A. The relatively short conveyor belt 29 can be supported by upstanding relatively short standards 31. A drive pulley 31' is carried by the frame 9 and is driven by a suitable drive belt 32 extending from the separator and this pulley 31' is in turn connected by a drive belt 33 with one roller 13 of the endless conveyor 11. This belt 33 can also have one run thereof in frictional contact with one roller of the conveyor 29 so as to operate the same. In order to bring about the operation of the conveyor belt 17 a short drive belt 34 is provided for connecting the roller 13 of the conveyor 11 with one roller 19 of the endless conveyor 17. This drive roller 13 of the endless conveyor is also connected by means of a drive belt 35 with the crank shaft 26.

The bundles of grain can be elevated into the hopper B in any preferred way and as shown a hoist pulley 40 is connected with a suitable support 41 carried by the hopper 5. This pulley 40 is of course adapted to have trained about the same a suitable hoisting cable which can carry elevating or grasping forks.

From the foregoing description it can be seen that an exceptionally simple self-feeder has been provided for grain separators which will effectively feed the bundles in a cut condition into the separator in an expeditious and convenient manner.

Changes in details may be made without departing from the spirit or the scope of this invention.

What is claimed is:—

The combination with a grain separator, of a self-feeder therefor including a frame connected with the separator, a hopper carried by the frame having its lower end tapered, a horizontally disposed conveyor belt arranged in the lower end of the hopper, bundle cutting knives disposed in the hopper at one end of the conveyor, a vertically disposed endless belt arranged in the hopper for preventing the clogging up of the bundles therein, and conveyor belts arranged below the hopper at one end thereof for receiving the cut bundles from the first mentioned conveyor and the cutting knives for delivering the same into the separator.

In testimony whereof I affix my signature in presence of two witnesses.

RUSSELL D. PUGH.

Witnesses:
M. E. HOLMES,
IDA HOLMES.